May 3, 1966  J. G. BOLGER, JR  3,249,022
PRESSURE-RESPONSIVE DEVICE
Filed April 22, 1964  2 Sheets-Sheet 2
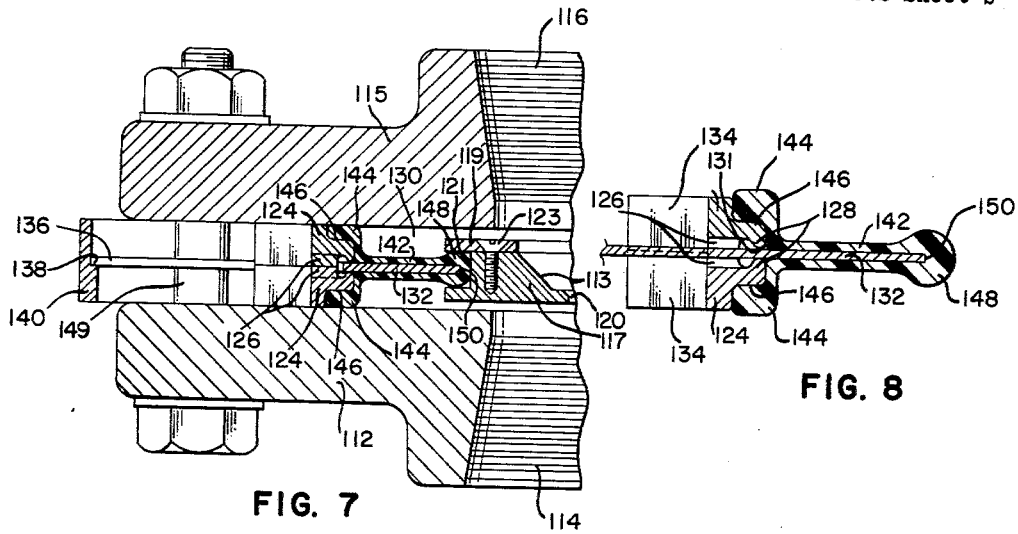
FIG. 7
FIG. 8
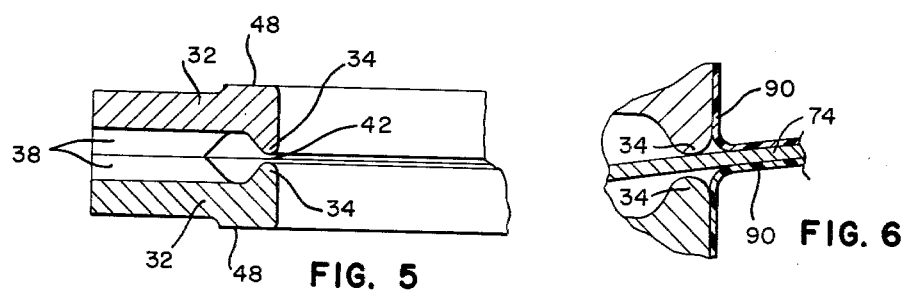
FIG. 5
FIG. 6
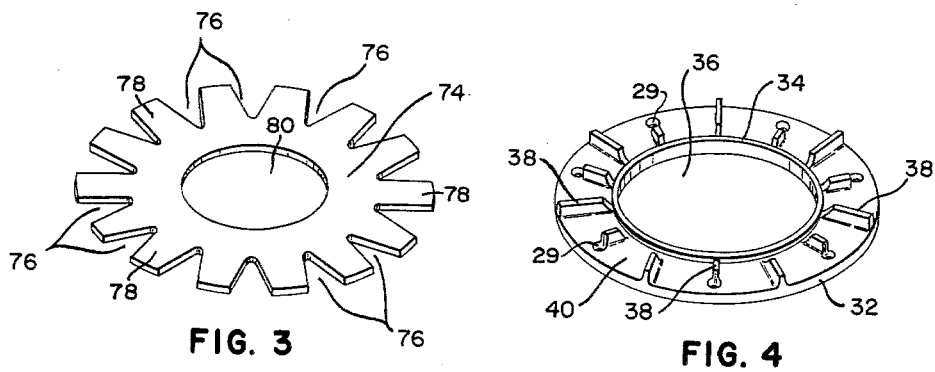
FIG. 3
FIG. 4
*INVENTOR.*
JOHN G. BOLGER, JR.
BY Hoppe & Mitchell
*his* ATTORNEYS

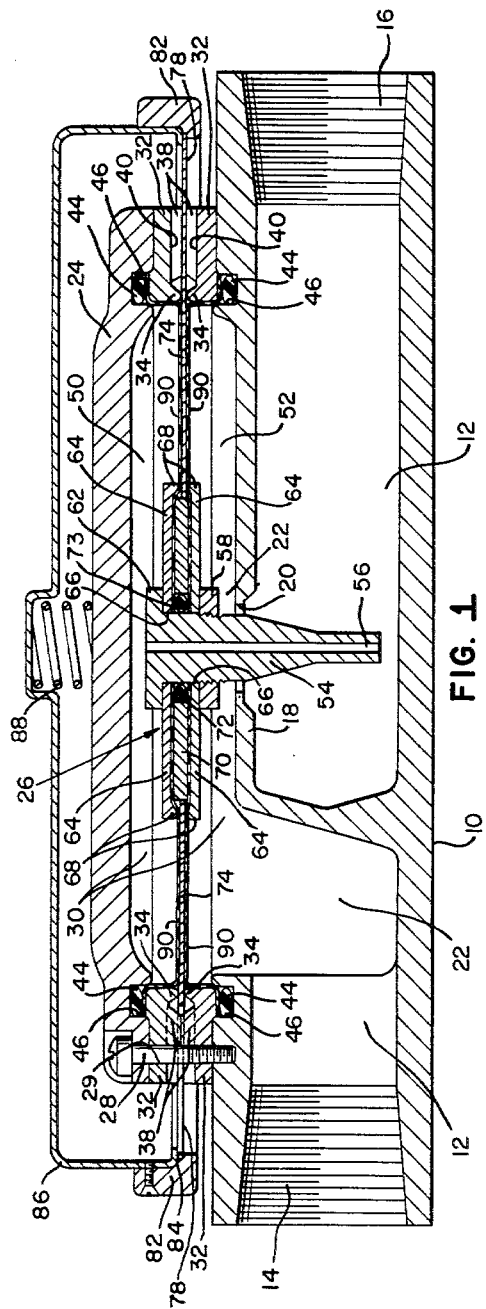

United States Patent Office 3,249,022
Patented May 3, 1966

3,249,022
PRESSURE-RESPONSIVE DEVICE
John G. Belger, Jr., 1051 Oak Knoll Road,
Lafayette, Calif.
Filed Apr. 22, 1964, Ser. No. 361,835
12 Claims. (Cl. 92—100)

The invention relates generally to pressure-responsive devices and, more particularly, to a device that is responsive to a pressure differential existing in a fluid medium, such as a liquid or a gas. Still more specifically, the invention relates to a pressure-responsive device in which a mechanical output is obtained in response to the pressure differential existing across an orifice through which a liquid or gas is flowing. Devices of this type are frequently employed as flow meters, flow switches or as differential pressure gauges.

The invention has for its object the provision of a dependable, highly sensitive, relatively inexpensive pressure-responsive device which can be employed to produce a mechanical output signal. Heretofore, it has been difficult, in pressure-responsive devices of the mechanical type, to obtain a dependable, yet highly sensitive, device that can be produced relatively inexpensively. Part of the trouble lies in the difficulty in obtaining a significant mechanical output or working stroke that is substantially free from extraneous influences which would give an erroneous reading.

In the present invention, the aforementioned object is achieved by means of a novel sensing arrangement which provides a substantially frictionless response to the pressure being sensed while still giving a significant output or working stroke. The achievement of the invention is also due, in significant part, to a novel means for sealing the pressure sensing element from leakage of fluid without introducing erroneous influences on the output of the pressure sensing element.

Broadly, the present invention comprises a highly flexible pressure sensing element that is so positioned within the housing for the device as to be substantially unconfined therein. Movement of the flexible pressure sensing element in response to the pressure of the fluid medium results in a bending of the element about a smoothly contoured fulcrum point so that the flexure is accomplished without any substantial friction. The mounting of the flexible pressure sensing element in such a manner is permitted by a sealing arrangement which prevents leakage of fluid past the unconfined flexible pressure sensing element at its fulcrum point. In general, this is achieved by providing at the surface of the flexible sensing element a thin, flexible and impervious membrane which seals off the clearance openings around the flexible sensing element at the fulcrum point.

Two presently preferred embodiments of the invention are shown in the accompanying drawings and will be described in detail hereinafter, but the description to follow is intended to be exemplary of the invention only and is not intended to define or restrict the scope of the invention. The claims appended hereto, together with their lawful equivalents, are relied upon for that purpose.

Of the drawings:

FIGURE 1 is a sectional view in side elevation through the center line of a liquid conduit which has been provided with an embodiment of the invention, showing the positions of the various parts of the device when there is no flow of liquid in the conduit;

FIG. 2 is a sectional view similar to that of FIGURE 1 showing the positions of the various parts of the device when there is liquid flow in the conduit;

FIG. 3 is a perspective view of the flexible pressure sensing element of the embodiment shown in FIGS. 1 and 2;

FIG. 4 is a perspective view of one of the mounting rings for the flexible pressure sensing element of FIG. 3;

FIG. 5 is an enlarged partial sectional view through the mounting rings showing their assembled positions;

FIG. 6 is a partial and enlarged sectional view showing the details of the sealing arrangement between the flexible sensing element and the mounting rings at the fulcrum point for the sensing element;

FIG. 7 is a partial sectional view through another liquid conduit showing another possible embodiment of the invention and;

FIG. 8 is a partial and enlarged sectional view through the mounting rings of the embodiment shown in FIG. 7 showing a modified sealing arrangement for the pressure sensing element.

As shown in FIGURE 1, the invention is adapted to be secured to the casing 10 of a liquid conduit 12 having the usual inlet opening 14 and outlet opening 16. Intermediate the inlet and outlet openings 14, 16, the casing 10 is formed so as to define a horizontal, lateral wall 18 in which there is formed an orifice 20. Immediately upstream of the orifice 20 there is formed in the casing 10 an open chamber 22. A second casing 24, housing the components of the pressure sensing device (indicated generally by the reference numeral 26) is secured to the conduit casing 10 and is so formed as to cover the upper portion of the chamber 22 formed therein. The casings 10 and 24 are joined together by suitable fastening means such as the machine screws 28 in openings 29, 29.

The casing 24 of the pressure sensing device 26 is not joined directly with the casing 10 of the conduit 12 but is spaced therefrom so as to form an enlarged chamber 30 immediately upstream of the orifice 20 in the conduit 12. For this purpose, a pair of annular spacers or mounting plates 32 are interposed between the casing 24 for the sensing device 26 and the casing 10 for the conduit 12. As is best seen by reference to FIG. 4, each spacer 32 is formed with a raised annular embossment 34 about the periphery of the central opening 36 in the spacer. In addition, radially extending embossments 38, 38 are spaced about the flange 40 of the spacer 32. These latter embossments 38, 38 extend slightly higher than does the annular embossment 34 around the central opening 36 in the spacer and engage similar embossments provided on the other of said spacer or mounting plates 32. When the mounting plates 32, 32 are engaged, a clearance opening 42 is formed between the upper and the lower annular embossments 34, 34 on the mounting plates 32, 32 adjacent the central openings 36, 36 therein. (See FIG. 5.) Both the conduit casing 10 and the casing 24 for the sensing device are provided with annular grooves 46, 46 and suitable sealing means, such as O-rings 44, 44 are positioned in these grooves. A corresponding rim 48, 48 is provided on each of the spacer plates and the rims extend inwardly of the grooves 46, 46 a sufficient amount to place the O-rings 44, 44 under compression and to effect a liquid seal at these points.

The chamber 30 immediately upstream of the orifice 20 is divided into two separate liquid-tight sections 50 and 52, respectively, by the pressure sensing element 26. The lower section 52 of the chamber 30 is a continuation of the inlet opening 14 and so is subject to the liquid pressure at the upstream side of the orifice 20. The upper section 50 of the chamber 30, however, is subjected to the liquid pressure at the downstream side of the orifice 20 through the pressure sensing element 26. As is best shown in FIG. 1, the pressure sensing element 26 includes a flanged probe 54 which has a body of sufficient length to extend downwardly to a point substantially below the orifice 20 in the outlet 12. A passageway 56 extends completely through the probe 54 so that the downstream liquid pressure is communicated to the upper section 52.

A retaining nut 58 is provided and between this nut and the flange 62 on the probe 54 are a pair of circular discs 64, 64. The discs 64, 64 are each provided with a central opening 66 which enables the discs to fit about the body of the probe 54 and, at their outer edge portions, the discs 64, 64 are each provided with a peripheral embossment 68 and the discs are positioned on the probe 54 so that each of the embossments 68, 68 extends inwardly toward the opposite embossment on the other disc. An annular spacing element 70 is positioned between the discs 64, 64 and serves to hold them in fixed relationship to each other. A central opening 72 is provided in the spacing element 70 and is larger than the diameter of the body of the probe 54 in order to accommodate an O-ring 73 that serves to effect a liquid-tight seal with the body of the probe 54. As in the case of the embossments 34, 34 on the annular spacers or mounting plates 32, 32 the discs 64, 64 are also so spaced as to provide a clearance opening between the embossments 68, 68.

A thin flexure plate 74 joins the probe 54 and the discs 64, 64 to the spacers or mounting plates 32, 32 at the periphery of the casing 24. The flexure plate 74 is shown in detail in FIG. 3 and, as seen there, comprises a generally annular member, the outer periphery of which is formed with a series of indentations 76, 76 which divide the outer periphery of the plate into a plurality of square finger-like extensions 78, 78. A large central opening 80 is provided in the plate 74 and the diameter of this opening is slightly greater than the outer diameter of the spacing element 70 mounted between the discs 64, 64 on the body of the probe 54. The overall diameter of the flexure plate 74 is greater than the diameter of the casing 24 so that the outer peripheral finger-like extensions 78, 78 extend beyond the outer edge portions of the casing.

As is best seen in FIG. 1, the flexure plate 74 is mounted between the inwardly extending embossments 68, 68 and 34, 34 on the discs respectively and the spacers 64, 64 or mounting plates 32, 32. The clearance between these embossments, however, is greater than the thickness of the plate 74, which is quite small, being on the order of 0.020 inch. The clearance need only be such that the flexure plate 74 is mounted in an unconfined manner, that is, the mounting of the flexure plate is such that the plate is not rigidly joined to or clamped by any other member of the pressure sensing device.

The indentations 76, 76 formed in the outer periphery of the flexure plate 74 permit the flexure plate to be mounted between the spacers or mounting plates 32, 32 in such a way that the indentations straddle the radially extending embossments 38, 38 on the flanges 40, 40 of the spacers 32, 32 and extend outwardly beyond the casing 24. At the outermost edge portions, extensions of the flexure plate 74 engage an annular follower ring 82. The follower ring 82 has a shoulder 84 formed at the lower end and the extensions of the flexure plate 74 bear against this shoulder. The follower ring 82 is fastened to a yoke-like trip lever 86 that is biased in one direction by a coil spring 88 mounted on top of the casing 24 for the pressure-sensing device. The trip lever 86 may be employed to convert the working or output stroke of the flexure plate 74 to some useful purpose as, for instance, to operate a micro-switch or to move an indicating needle.

As will be seen by reference to FIGS. 5 and 6, the embossments 34, 34 on the spacer or mounting plates 32, 32, as well as the embossments 68, 68 on the discs 64, 64, are gently curved so as to provide a smoothly contoured fulcrum point for the flexure plate 74. As a result of this construction, the flexure of the plate 74 occurs with a rolling, substantially frictionless, contact between the plate and these two points.

The clearance between the embossments 34, 34, 68, 68 on the mounting plates 32, 32 and the circular discs 64, 64 would provide a point of leakage if not effectively sealed. Accordingly, the flexure plate 74 is sandwiched between two thin films of a flexible, impervious membrane 90 of elastomer or plastic. The membrane or film 90 is thin enough that the force required to make it follow the flexure plate 74 is negligible. The thickness of the film, however, is adequate to resist the line pressure in the conduit 12 as applied across the clearance gap 42 between the flexure plate 74 and the mounting plates 32, 32. Since this clearance gap 42 is of the order of only a few thousands of an inch, the thin flexible membrane has sufficient strength to resist substantial pressures in the conduit 12. The sealing film may consist of any thin impervious membrane. Plastic film, such as polyethylene, for example, on the order of about .006 of an inch in thickness, is preferred, but other suitable materials and thicknesses may be employed, as well. It is only necessary that the sealing film be thin enough to follow the movement of the flexure plate with only negligible force, yet still be strong enough to effectively seal the slight clearance existing between the flexure plate 74 and the opening 42 between the mounting plates 32, 32. The sealing film is secured, at its outer periphery, by being inserted between the rims 48, 48 on the spacer plates 32, 32, and the O-rings 44, 44 in the grooves 46, 46. Similarly, the sealing film is secured at its inner periphery by being inserted between discs 64, 64 and the annular spacing element 70. In this manner, the membranes are so disposed as to be in sealing relation with the opening of the clearance gap 42.

In normal operation, with no flow of liquid through the conduit 12, the position of the device will be as shown in FIGURE 1. In this condition, the flexure plate 74 will assume the position substantially as shown, which is its unflexed condition. Upon the establishment of a flow of liquid through the conduit 12, a pressure differential is created across the orifice 20 and this pressure differential is also created across the flexure plate 74 due to the passageway 56 in the body of the probe 54 being in communication with the upper section 50 of the chamber 30 and with the downstream side of the orifice 20. The pressure differential acting on the flexure plate 74 moves the circular discs 64, 64 and the probe 54 upwardly toward the upper section 50 of the chamber 30. This upward movement causes the flexure plate 74 to bend upwardly. As it does so, the flexure plate 74 rolls about the smoothly contoured fulcrum points 68 and 34. Because of this substantially unconfined mounting of the flexure plate 74 in the spacers 32, 32 flexure of the plate 74 is truly proportional to the pressure differential across the sensing device. The upward flexure of the plate 74 moves the outermost extensions 78, 78 thereof in a downward manner, causing the follower ring 82 and the yoke-like trip lever 84 to be depressed against the tension of the coil spring 88. As the flexure plate 74 is bent by the pressure across the sensing device and moves upwardly to assume its curved condition, the thin sealing film of plastic 90 on both sides of the flexure plate 74 conform to the curvature of the plate. At the same time, the film of plastic 90 serves to close off the clearance opening 42 between the embossments 34, 34 on the mounting plates 32, 32.

In an alternative form of the invention, shown in FIGS. 7 and 8, the invention is adapted to be mounted between two flange couplings without modifying the coupling members. The lower flange coupling 112 (as viewed in FIG. 7) has an inlet opening 114, while the upper flange coupling 115 has an outlet opening 116. An orifice 120 is formed by a two-piece orifice ring 113 that is made up of a flanged body member 117 and a cover 119, the outer peripheral portions of which are spaced from the flange on the body member 117 so as to form an annular track or recess 121, the function of which will be described hereinafter. The cover 119 is removably secured to the body member 117 by any suitable fastening means such as the screws 123.

Two spacers or mounting plates 124, 124 are interposed between the faces of the flange couplings 112, 115 so as to offset the couplings a sufficient distance to accommodate the orifice ring 113. The spacers or mounting plates 124, 124 are of annular configuration and, as in the case of the embodiment of the invention previously described, are provided with radially extending embossments 126, 126 as well as annular embossments 128, 128 at the inner periphery of the central openings 130, 130 in the spacers. The height of the radially extending embossments 126, 126 is greater than the height of the annular embossments 128, 128 so as to form a clearance opening 131 for the passage of the flexure plate 132. Each spacer 124 is also provided with radially extending tabs 134, 134 that serve to space the flange couplings 112, 115.

The annular flexure plate 132 is provided with a series of indentations (not shown) which form finger-like extensions 136, 136 that extend beyond the tabs 134, 134 of the spacers 124, 124 and beyond the outermost edges of the flange couplings 112, 115. At their outer edge portions, the extensions 136, 136 of the flexure plate 132 engage a shoulder 138 on an annular follower ring 140. Bending of the flexure plate 132 causes the extensions 136, 136 thereof to move the follower ring 140 through a working stroke which can be employed to operate an electrical switch or actuate an indicating or metering device (not shown).

In this embodiment of the invention, the thin sealing membrane 142 is provided in a form that is molded to the flexure plate 132. As will be seen by reference to FIG. 8, the molded sealing membrane 142 is applied to both sides of the flexure plate 132 and has a thickened edge portion 144 that is disposed adjacent the faces of the coupling flanges 112, 115. In order to form an effective seal at these points, the thickness of the edge portions of the sealing film is increased to a point where it is greater than the spacing between the inner periphery 146 of the mounting plates 124, 124 and the coupling faces. When the bolts 149, 149 of the flanges 112, 115 are pulled up tight, the sealing film is, accordingly, tightly compressed and a liquid-tight seal is formed between the spacers and mounting plates 124, 124 and the coupling flanges 112, 115.

A similar thickened section 148 of sealing film is provided at the periphery of the central opening 150 in the flexure plate 132. The thickness of this section 148 of the film 142 is greater than the width of the recess or track 121 formed in the orifice ring 113. Since the diameter of the opening 150 in the plate 132 is less than the outer diameter of the orifice ring 113 the thickened section 148 of the film 142 extends within the recess 121 and, because of its greater thickness, forms a liquid-tight seal with the walls thereof.

When there is no flow of liquid through the couplings 112, 115, the flexure plate 132 will assume its unflexed condition in which it is substantially straight or unbent. Upon the creation of a liquid flow a pressure differential is created across the orifice 120 and, correspondingly, across the flexure plate 132. This pressure differential causes the flexure plate to bend upwardly (as viewed in FIG. 7). Upward bending of the center of the plate 132 causes the extensions 136, 136 to move downwardly in proportion to the value of the actuating pressure differential.

As in the case of the previously described embodiment of the invention, the fulcrum points on the embossments 128, 128 are smoothly contoured so that flexure of the plate 132 occurs without any substantial friction. As a result of the fulcrum points being smoothly contoured or rounded, the plate 132 is supported without damage to its surface and without impediment to its movement during flexure. It will also be noted that the fulcrum point for the flexure plate is so positioned that the movement of the extensions 136 is greater than that of the inner portion of the plate 132. The movement of the plate as a result of the pressure differential is thus amplified in the working stroke of the plate.

What is claimed is:

1. A fluid pressure sensing device comprising a flexible diaphragm having opposite sides and movable in response to a pressure differential across said diaphragm, means for subjecting opposite sides of said diaphragm to pressures of different value, mounting means for said diaphragm having an opening therein with opposite edge portions spaced from each other a greater distance than the thickness of said diaphragm so as to leave said diaphragm unconfined at said opening, said diaphragm extending outwardly through the opening in the mounting means and engageable with one edge portion thereof, the surface of at least one of said opposite edge portions being smoothly rounded where it engages said diaphragm, and sealing means for preventing the egress of fluid past said opening.

2. A fluid pressure sensing device as set forth in claim 1 wherein said mounting means comprise a pair of annular plates having mutually engageable portions positioned to create said opening in the mounting means, said diaphragm being formed to pass around said mutually engageable portions.

3. A fluid pressure sensing device as set out in claim 2 wherein said mutually engageable portions comprise radially extending embossments located outwardly of said opening and said diaphragm has peripheral openings to accommodate said embossments.

4. A fluid pressure sensing device as set forth in claim 3 wherein said pair of annular plates have oppositely disposed annular embossments positioned inwardly of said radial embossments and spaced at a distance from each other slightly greater than the thickness of said diaphragm.

5. A fluid pressure sensing device as set forth in claim 4 wherein said diaphragm has a large central opening.

6. A fluid pressure sensing device comprising a casing having at least one opening and defining a pressure vessel, a pressure sensing element located within the pressure vessel having a flexible diaphragm movable in response to a pressure differential, said diaphragm having at least one portion extending outwardly through the opening in the casing, and sealing means overlying said diaphragm and having inner and outer ends, said inner end being joined in fluid-tight engagement with the pressure sensing element and said outer end being joined in fluid-tight engagement with the casing for the pressure vessel at a point positioned to dispose said membrane in sealing relation to said opening.

7. A fluid pressure sensing device as set forth in claim 1 wherein both of said opposite edge portions are smoothly rounded for substantially frictionless engagement with said diaphragm.

8. A fluid pressure sensing device as set forth in claim 6 wherein said sealing means comprise at least one thin, impervious, flexible membrane overlying said diaphragm.

9. A fluid pressure sensing device as set forth in claim 8 wherein said sealing means comprises a pair of thin, impervious, flexible membranes disposed on opposite sides of said diaphragm.

10. A fluid pressure sensing device as set forth in claim 1 comprising a casing defining a pressure vessel in which said flexible diaphragm is positioned, and wherein said sealing means overlie said diaphragm and have inner and outer ends, said inner end being joined in fluid-tight engagement with the flexible diaphragm at a point inwardly of said opening, and said outer end being joined in fluid-tight engagement with the casing for the pressure vessel at a point positioned to dispose said sealing means in sealing relation to said opening.

11. A fluid pressure sensing device comprising a casing defining a pressure vessel, an opening in said casing having opposed edge portions, a pressure sensing element located within the pressure vessel and having a flexible diaphragm movable in response to a pressure differential, said diaphragm having at least one portion extending outwardly through the opening in the casing defined by said opposed edge portions, said opposed edge portions being smoothly rounded for substantially frictionless engagement with said diaphragm, and sealing means comprising a pair of thin, impervious, flexible membranes overlying opposite sides of said diaphragm and having inner and outer ends, said inner ends being joined in fluid-tight engagement with the pressure sensing element, and said outer ends being joined in fluid-tight engagement with the casing for the pressure vessel at a point positioned to dispose said membranes in sealing relation to said opening in the casing.

12. A fluid pressure sensing device as set forth in claim 11 wherein the portion of the diaphragm extending outwardly through the opening in the casing is provided with means for operating an auxiliary signal responsive device.

References Cited by the Examiner

UNITED STATES PATENTS

| | | | |
|---|---|---|---|
| 159,547 | 2/1875 | Harlow | 92—99 |
| 881,402 | 3/1908 | Hoglund | 92—103 |
| 1,229,860 | 6/1917 | Ashelman et al. | 92—103 |

SAMUEL LEVINE, *Primary Examiner.*